J. GOSIEWSKI.
DOUGH CUTTING MACHINE.
APPLICATION FILED JAN. 17, 1918.
1,295,024.
Patented Feb. 18, 1919.
3 SHEETS—SHEET 1.
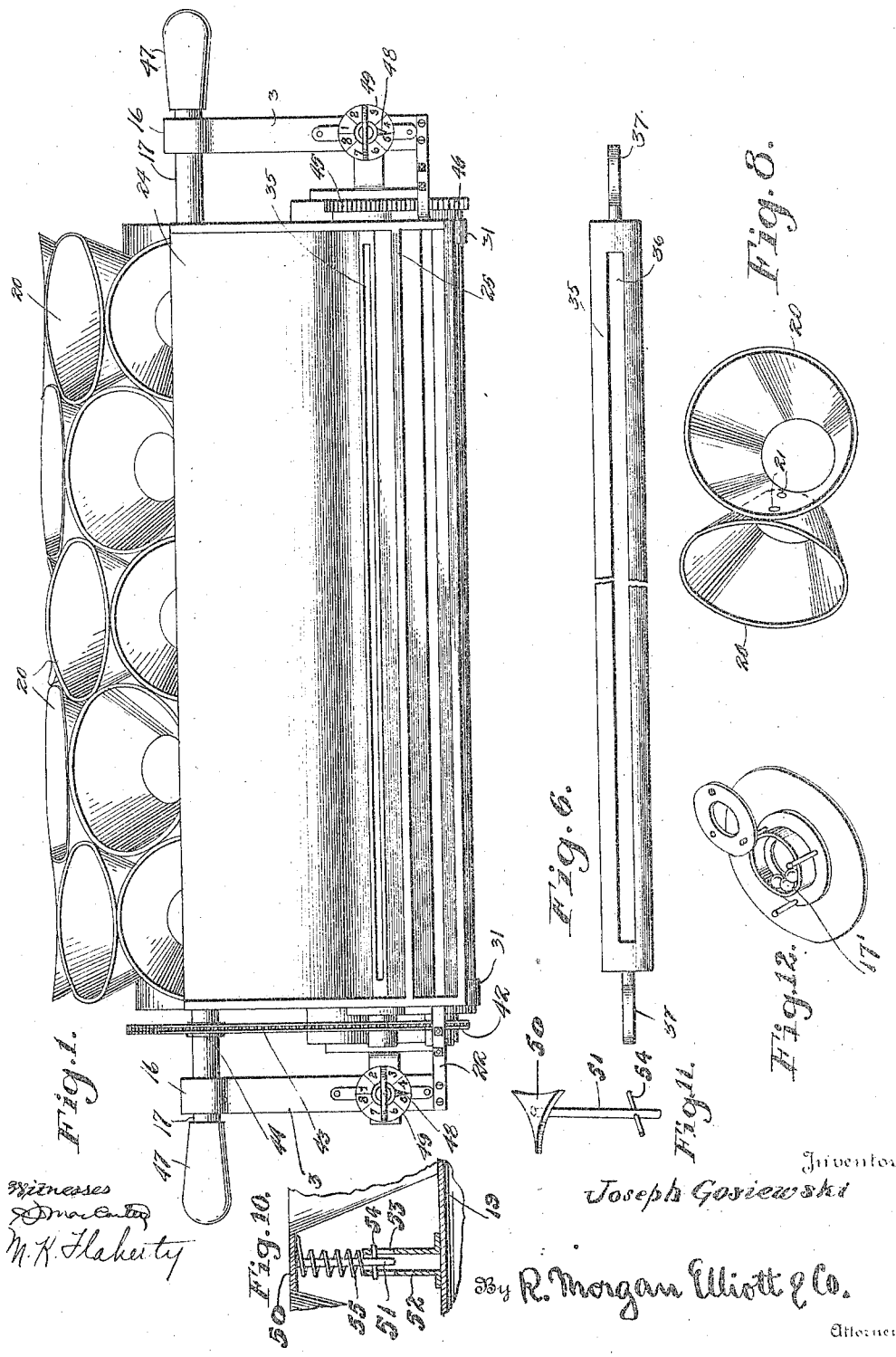

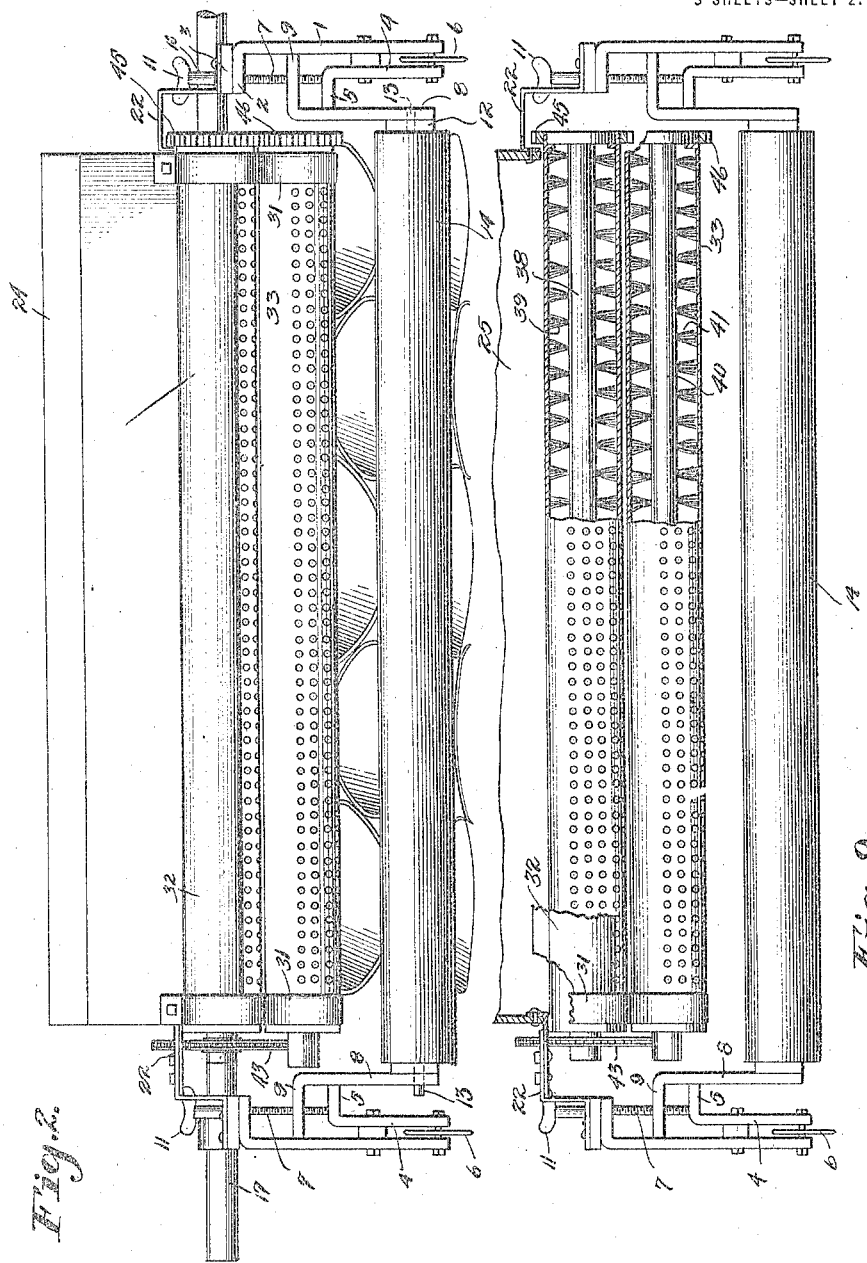

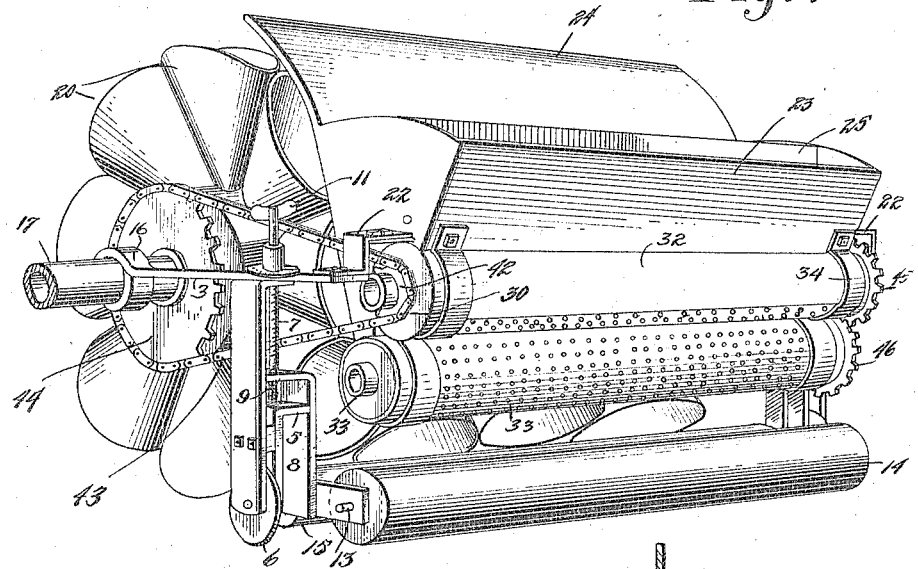
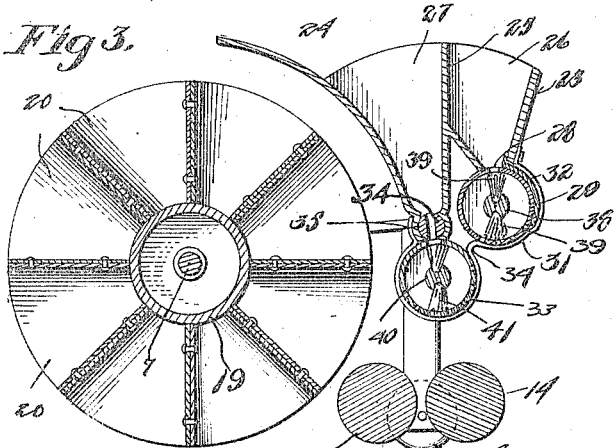
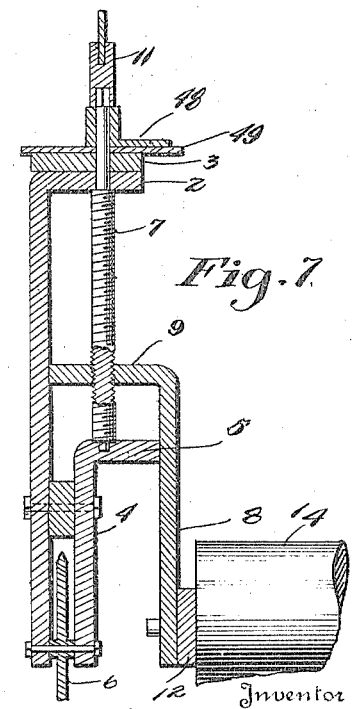
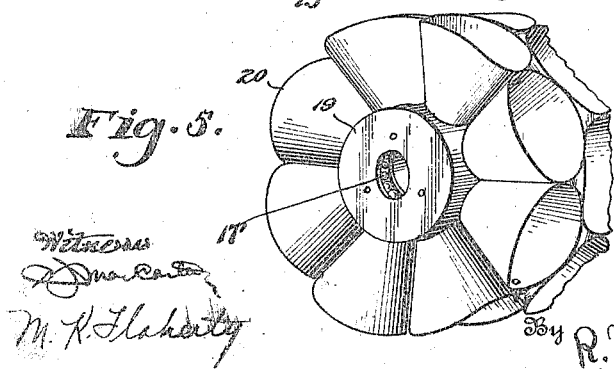

UNITED STATES PATENT OFFICE.

JOSEPH GOSIEWSKI, OF UTICA, NEW YORK.

DOUGH-CUTTING MACHINE.

1,295,024.   Specification of Letters Patent.   Patented Feb. 18, 1919.

Application filed January 17, 1918. Serial No. 212,241.

*To all whom it may concern:*

Be it known that I, JOSEPH GOSIEWSKI, a citizen of Russian Poland, residing at Utica in the county of Oneida and State of New York, have invented certain new and useful Improvements in Dough-Cutting Machines, of which the following is a specification.

This invention relates to dough cutting machines, and has special reference to machines for cutting small cakes known to bakers as "cookies."

The primary object of the invention is to provide a machine of particular advantage to bakers, who bake quantities of small cakes or cookies which are cut from rolled dough by means of cutters whose edges have a circular or other representative contour. By the process which is known to me to be practically universal in use at this time, a mass of dough is first rolled out into a thin layer which must depend for its thickness and uniformity upon the expertness of the baker, after which the cakes are cut out by means of individual cutters which are pushed through the dough to form the cakes. This is obviously a lengthy and tedious process where it is necessary to bake the cakes or cookies in large quantities. I have therefore devised the machine of the present invention wherein a number of cutters is arranged upon a rotatable cylinder or spindle, and the latter is mounted upon a carriage to be operated over a layer of dough in such a manner that the edges of the cutters are pushed through the dough while the cylinder or spindle is rotated.

A further object of the invention consists in the provision of a means for rolling the layer of dough to a uniform thickness before the cutter members are brought into contact therewith so that it is not necessary to depend upon the expertness of the baker to insure a uniform thickness to the lot of cakes in a baking. Also, in this connection it is the intention to provide the preliminary rolling mechanism with an adjustable support, with which is associated an indicating mechanism, so that by a preliminary adjustment of the support the layer of dough will be rolled to a uniform thickness which is predetermined.

It is likewise an object of the invention to provide a sifting mechanism in association with the cutting mechanism by means of which both flour and sugar may be sifted upon the layer of dough in successive layers so that the flour layer will prevent the dough from sticking to the cutters as they cut into the latter, and the sugar layer may be rolled into the dough in order to provide the characteristic feature of that type of small cakes known as "sugar cookies." In this connection, there is provided a means for shutting off the sugar supply so that when it is desired to make cakes of another style, the sugar sifting apparatus may be rendered inactive.

With the above and other objects in view, and such others relating to the details of construction as may hereinafter appear, my invention will now be fully set forth and described reference being had to the accompanying drawings, in which like reference characters indicate like parts throughout and:—

Figure 1 is a plan view.

Fig. 2 is a front elevation, part of the mechanism being removed and another part being broken away.

Fig. 3 is a transverse section through the machine.

Fig. 4 is a perspective view of the machine.

Fig. 5 is a detail perspective showing a portion of the cutter spindle and a number of the cutters.

Fig. 6 is a side elevation of the valve.

Fig. 7 is a larger sectional view through the end frame, and

Fig. 8 is a detail perspective view of a pair of cutter elements.

Fig. 9 is a front elevation with parts removed and broken away.

Fig. 10 is a fragmentary detail sectional view.

Fig. 11 is a perspective view and

Fig. 12 is a detail perspective view of a bearing.

Referring more particularly to the drawings, 1 represents each of a pair of vertical members whose upper ends are inturned to provide brackets 2 upon which are mounted the longitudinally extended frame and bearing elements or bars 3. Also, bolted or otherwise secured to the inner face of each one of the members 1, at its lower end, is an L-shaped support 4 and an inwardly extending arm 5 thereof underlying the inturned bracket 2, for a purpose which will hereinafter appear. The members 4 are furthermore spaced from the members 1 in a suitable manner so as to provide therebetween recesses within which the supporting and guiding wheels 6 may be journaled.

Mounted in the vertical bearing in the bracket member 2 and also extending through the horizontal bar 3 is a bolt 7 whose foot rests upon the upper surface of the arm 5, said bolts 7 constituting adjusting supports for a pair of roller brackets 8. The roller brackets 8 include L-shaped end pieces having the horizontal arms 9 which are threaded upon the bolts 7 and have their free ends squared to ride against the inner faces of the members 1 while the free ends of the arms 5 are similarly squared to ride against the outer faces of said end pieces of the brackets 8. The upper ends of the bolts 7, where they pass through the brackets 2 are reduced in diameter to provide shoulders which bear against the lower faces of the brackets 2 and above the latter and the bars 3 have fixed thereon the collars or sleeves 10 which rotatably fix the bolts 7. Furthermore, the free ends of the bolts 7 are squared to receive a key 11 by means of which the bolts may be rotated in order to vary the relative vertical positions of the roller frames 8. Secured to and extending across the lower ends of the roller supporting frames 8 are secured the bars 12 in which the spindles 13 of the rollers 14 and 15 are journaled.

The rollers 14 and 15 are freely revoluble and are mounted on the same level and by reason of their vertical adjustment which is permitted by the raising and lowering of the end frames 8, they may be operated to flatten a layer of dough, to a uniform thickness throughout, prior to the cutting of the same into cakes. Also, by reason of the arrangement of supply hoppers and distributing devices hereinafter described, the rollers may be caused to roll on to the dough successively layers of flour and sugar to follow out the necessary steps of a cookie or cake making process.

The rear ends of the horizontal bars 3 are shaped into or otherwise provided with the bearings 16 within which is journaled a shaft 17. Mounted upon the shaft 17 by means of the anti-friction ball-bearing series 17' is a drum or cylinder 19 which corresponds in extent to the lengths of the rollers 14 and 15, and carries upon its periphery a series of cutters 20. Each of the cutters 20 consists of a frusto-conical sheet metal structure whose smaller end is butted against the periphery of the drum 19, so that the cutter flares away from the latter and has its free edge sharpened so as to bite cleanly through a mass of dough. The inclination of the outer surfaces of the frusto-conical shapes is such that when the cutters are banked in circular series around the drum 19, said outer surfaces of the cutters will lie against one another throughout the heights of the frustrated cones and rivets 21 may be passed through the walls of the cutters to unite them in the circular series. A number of circular series of cutters are arranged upon the drum 19, the cutters of each series being staggered with relation to the cutters of the previous series so that as the cutting edges of all of the cutters traverse the layer of dough, the cakes will be cut out with a minimum of waste. While the cutters in the present instance are shown as circular devices, it is obvious that they may be substituted for cutters having edges which define other characteristic outlines.

The forward ends of the bars 3 overhang the brackets 2 to provide supports for the hopper carriers 22. Said carriers 22 project toward one another and have secured therebetween a hopper 23 whose rear wall is extended upwardly and rearwardly in a curved apron 24 which overlies the cutter cylinder. The hopper 23 is longitudinally divided by a partition 25 into a forward compartment 26 and a rear compartment 27. The forward compartment 26 terminates at its lower end in an elongated slot 28 across which the periphery of a perforated sifter cylinder 29 extends. The sifter cylinder 29 is formed of a reticulated metal cylinder having the heads 30 which close its ends. Also, the cylinder 29 is supported against the bottom of the compartment 23 by means of the bands 31. Thus, the cylinder 29 is adapted to sift or powder the material in the compartment 26 on to the layer of dough just in front of the roller 14. A cover plate 32 is secured below the bands 31 and overlies the front of the cylinder, so that the material from the compartment 26 will not be sifted through the front of the cylinder but will all be shaken through the lower side thereof. Also, the lower end of the compartment 27 is shaped into an elongated slot against which a second sifter cylinder 33 is supported, the bands 31 being downwardly and rearwardly shaped to carry the cylinder 33 against the compartment 27. The cylinder 33 is furthermore so positioned that the material fed thereto from the compartment 27 will be sifted between the rollers 14 and 15, or rather in front of the roller 15 so that as the machine is progressed across the layer of dough the siftings will be compressed by the roller into the surface of the dough. It may happen, that at certain times the use of the second compartment 27 is not desirable, and provision is therefore made so that the contents of the compartment 27 will not be sifted. Thus, the front and rear walls of the compartment 27 at their lower ends are shaped into an elongated cylindrical valve or cut-off casing 34 within which the valve 35 is rotatably mounted. Said valve 35, as best shown in Fig. 6 is an elongated bar having formed therethrough the slot 36 which, by rotation of the bar through the use of the thumb-pieces 37 may be caused to open the way for material to pass from the compartment 27 into the cylinder 33, or when turned at right angles to the open position will cut off the flow of material.

The heads 30 in the cylinder 29 provide bearings for a shaft 38, and the latter forms the body from which two or more series or sets of bristles 39 radiate. The sets of bristles 39 extend throughout the length of the shaft 38, and are arranged to brush against the interior surface of the cylinder 29 so as to act as agitators and distributers for the material which passes from the compartment 26 into the cylinder. A similar shaft 40 has its bearings in the heads of the cylinder 33, and also carries the similar series of bristles 41 which engage with the interior surface of the cylinder 33 so as to aid in the distribution of the material which passes from the compartment 27 into the cylinder 33. The end of the shaft 38 extends beyond one end of the cylinder 29 so that there may be secured thereon a sprocket wheel 42 over which a chain 43 passes. The chain 43 also operates over a large sprocket wheel 44 which is secured upon the shaft 17, so that as the cutter cylinder is rotated through the contact of the cutters with the dough surface, the shaft 38 will be rotated through the connecting chain 43. The opposite end of the shaft 38 is provided with a gear wheel 45 which meshes with a similar wheel 46 mounted upon the projected end of the shaft 40 which is journaled in the heads of the cylinder 33, so that the main shaft 17 will be connected to the shaft 33. In this manner, provision is made for the continuous agitation of the materials delivered from the hopper 23 to the sifter cylinders when the machine is in operation.

In order to provide a convenient means for directing and pushing the cutter across the surface, the ends of the shaft 17 are extended beyond the side frames and carry on the extended portions the freely rotatable hand grips 47. In preparing the device for use, the rollers 14 and 15 are adjusted vertically to the necessary height above the surface of the table to determine the desired thickness of the cakes to be cut, the vertical adjustment being accomplished by rotating the screws 7 the screws 7 have connected thereto sleeves which carry index fingers or pointers 48 which overlie the indicator disks 49. Said disks 49 are graduated into suitable sub-divisions which indicate the height of the rollers above the cutting surface, so that as the machine is rolled over the layer of dough, the rollers 14 and 15 will primarily compress it to the proper thickness. The cutter cylinder rotating just behind the roller 15 then cuts through the dough to sever therefrom the cake blanks. As herein described, the sifter cylinder 29 is positioned just forward of the roller 14, so that flour contained in the compartment 26 will be sifted thereby on to the dough prior to the passage thereover of the roller 14, the latter thus rolling the flour into the dough and preparing it for the clean passage of the cutter blades therethrough.

Likewise, the sifter cylinder 33 stands just forward of the roller 15, so that sugar contained within the compartment 27 may be distributed upon the dough surface and compressed into the dough. Then, the banks of cutters are passed over the dough and in view of the fact that the cutters are arranged in circular series, the layers of dough of any length can be cut into blanks by a single passage of the machine thereover. In the operation just described, the process of making so called "sugar cookies" was set forth, but where it is desired to make cookies or cakes without the sugar coating, the valve 35 is rotated to cut off the passage of material from the passage 27 to the cylinder 33, so that only the flour is sifted on to the surface of the dough. Obviously, other material than sugar may be placed in the compartment 27 for distribution on to the dough surface to make cakes of other kinds.

The machine which has been described constitutes a simple and effective instrument for use in bakeries of various sizes, since the machine can successfully be embodied in various sizes, and its use is equally successful in hotels, large housholds, and other establishments wherein cakes of this kind are made in quantities.

While I have described one preferred embodiment of the machine, it will of course, lie within the scope of the invention to make numerous changes in the details of construction without departing from the spirit of the invention or the limits of the claims.

For instance, it is sometimes necessary to provide ejecting devices in the interstices between the several cutters 20, so that the general triangular pieces of dough which are left by the cutting of the circular cakes will not adhere between the cutters and become packed therein. For this purpose ejecting plates 50 are fitted between the cutters, as shown in the modification of Fig. 10, the plates 50 being supported by stems 51 which operate in the tubular guides 52 mounted on the cylinder 19. The stems 51 are held in position by means of cross pins 54 which are carried by the stems and operate in slots 53 formed in the walls of the guides 52, coil springs 55 which are also carried by the stems normally throwing the plates 50 into that position where they normally close the interstices between the cutters. Then, when the machine is run over a layer of dough, the plates 50 are pushed inwardly by the dough as they come in co tact it the latter, but as soon as the cutters leave the dough, the plates are pushed outwardly by their springs 55 so that the little triangular dough sections are forced from the interstices, thereby preventing the clogging of the machine.

What I claim as new, is:—

1. A hand implement, comprising a wheel supported frame adapted for movement over the material to be cut, a rotatable cutter drum mounted in said frame, a plurality of cutter dies mounted on the periphery of the drum, and handles carried by said drum, whereby said frame and cutter drum may be moved over the material to be cut.

2. A hand implement comprising a wheel supported frame adapted for movement over the material to be cut, a rotatable cutter drum mounted in said frame, a plurality of cutter dies mounted on the periphery of the drum, handles carried by said drum for moving the frame and drum over the material to be cut and means rotatably mounted in said frame to even the lay of material prior to the movement of the cutters of the drum thereover.

3. A hand implement, comprising a wheel supported frame adapted for movement over the material to be cut, a rotatable drum journaled in said frame, a plurality of cutter dies carried by said drum, means rotatably mounted in the frame to even the lay of material prior to the passage of the cutters thereover, and vertical adjusting means to regulate the evening means whereby material of different thicknesses may be cut.

4. A hand implement, comprising a wheel supported frame, a rotatable cutter drum mounted in said frame and having a plurality of cutter dies on its periphery, means for rotating said drum and frame and evening rollers adjustably carried by said frame forward of said cutter drum.

5. A hand implement, comprising a wheel supported frame, a rotatable cutter drum journaled in said frame, a plurality of cutter dies mounted on the periphery of the drum, handles carried by the drum whereby the frame and drum may be rotated over the material to be cut, vertically adjustable evening rollers carried by the frame in advance of the cutter drum and means to vertically adjust the rollers.

6. A hand implement comprising a wheel supported frame adapted for movement over the material to be cut, a rotatable cutting drum, means for rotatably supporting the cutter drum to the frame, a set of evening rollers, means carrying said rollers as a unit in advance of a cutter drum and means connecting the evening rollers to the first named movable frame.

7. A hand implement, comprising a wheel supported frame adapted for movement from the material to be cut, a rotatable cutter drum journaled in said frame, a plurality of cutter dies mounted on the periphery of the drum, a set of evening rollers, frames carrying said evening rollers as a unit, means connecting the evening roller frames to the wheel supported frame and said connecting means being adjustable vertically to vary the distance of the rollers over the material to be cut.

8. A hand implement comprising a wheel supported frame adapted for movement over the material to be cut, a rotatable cutting drum, a frame for said drum, means for connecting said frame to the wheel supported frame, a plurality of cutter dies mounted on the periphery of the cutter drum, and means to sift a coat upon the material prior to the passage of the cutters thereover.

9. A hand evener comprising a wheel supported frame adapted for movement over the material to be cut, a rotatable cutter drum, means for journaling the cutter drum to the wheel supported frame, means carried by the drum whereby said drum and wheel supported frame may be moved, means to even the lay of material prior to the passage of the cutter thereover, means to adjustably support evening means for the wheel supported frame and means to sift a coat on the material.

10. A hand implement, comprising a wheel supported frame adapted for movement over the material to be cut, a rotatable cutter drum, a plurality of cutter dies mounted on the periphery of the drum, a frame carrying said cutter drum, and connected to the wheel supported frame, means carried by the drum whereby said frame and cutter drum may be moved over the material to be cut, evening rollers vertically adjustably connected to said wheel supported frame, and means to sift a coat on the material in front of the evening means so that the latter will compress the coat into the material.

In testimony whereof I affix my signature.

JOSEPH H GOSIEWSKI.

Witnesses:
T. L. WILD,
E. EARL JONES.